United States Patent [19]

Robinson, III

[11] Patent Number: 4,528,636

[45] Date of Patent: Jul. 9, 1985

[54] DISPLAY MEMORY WITH WRITE INHIBIT SIGNAL FOR TRANSPARENT FOREGROUND PIXEL CODES

[75] Inventor: Irwin J. Robinson, III, Mesa, Ariz.

[73] Assignee: Intermark Industries, Inc., Phoenix, Ariz.

[21] Appl. No.: 312,719

[22] Filed: Oct. 19, 1981

[51] Int. Cl.[3] .............................................. G06F 3/153

[52] U.S. Cl. .................................... 364/521; 340/703; 340/799; 340/803; 364/900

[58] Field of Search ................ 364/521, 900 MS File, 364/749; 340/703, 723, 724, 725, 721, 747, 803

[56] References Cited

U.S. PATENT DOCUMENTS

| | | | |
|---|---|---|---|
| 3,937,878 | 2/1976 | Judice | 340/724 X |
| 4,045,789 | 8/1977 | Bristow | 340/724 X |
| 4,243,984 | 1/1981 | Ackley et al. | 340/725 X |
| 4,262,302 | 4/1981 | Sexton | 358/10 |
| 4,303,986 | 12/1981 | Lans | 340/703 X |
| 4,366,476 | 12/1982 | Hickin | 340/721 X |
| 4,375,671 | 3/1983 | Engle | 364/414 X |
| 4,379,293 | 4/1983 | Boisvert et al. | 340/750 |
| 4,398,189 | 8/1983 | Pasierb, Jr. et al. | 340/721 |
| 4,462,594 | 7/1984 | Bromley et al. | 273/85 G |

OTHER PUBLICATIONS

Dwyer, Edward, *A Single Board Color Graphics System with 'Transparent Memory'*, Canadian Electronics Engineering, Feb. 1979, 19-21, 62.

*Primary Examiner*—Jerry Smith
*Assistant Examiner*—Clark A. Jablon
*Attorney, Agent, or Firm*—Cahill, Sutton & Thomas

[57] ABSTRACT

A computer is connected to a display device having a display memory system that is updated by the computer. The computer selects a pattern to be displayed and a screen location at which the selected pattern is to be displayed. A display subroutine effects fetching of a byte of pattern data for the selected pattern from a dedicated memory. The fetched pattern data includes pixel codes that indicate whether corresponding pixels of the selected pattern are "transparent" or darkened. The display subroutine then transmits the pixel codes to the display memory system. The display memory system includes circuitry that detects whether each transmitted pixel code represents a transparent pixel. If it does, the circuitry inhibits writing of that pixel code into a storage portion of the display memory system. The circuitry also enables writing of non-transparent pixel codes into the storage portion of the display memory system.

21 Claims, 4 Drawing Figures

DISPLAY MEMORY WITH WRITE INHIBIT SIGNAL FOR TRANSPARENT FOREGROUND PIXEL CODES

BACKGROUND OF THE INVENTION

The invention relates to computer display systems and methods involving display memories, the contents of which are displayed on a display screen.

CRT (cathode ray tubes) display units are commonly used in computer systems. A display system typically includes a random access display memory that is addressable by both a computer and display address generating circuitry that automatically accesses sequential locations of the display memory at a sufficiently high rate to cause continuous CRT display of the present contents of the display memory. The display address generating circuitry is part of a larger circuit that also generates timing and control signals that synchronize the operation of the CRT, the display memory, and the computer. Numerous implementations of the above-described display system are commonly used, and can be readily implemented by those skilled in the art. The display software of such systems is frequently designed so that the main program and the display subroutine cooperate to select a new pattern to be displayed and "write" the new pattern (which is stored in a read only memory in the form of a pixel code for each pixel in a rectangular pattern area) on an already displayed pattern which is presently stored in the display memory.

The operation includes selection by the main program of both the new pattern to be displayed and the location of the CRT screen on which that new pattern is to be displayed. The display subroutine then uses this information to cause the computer to fetch a data word of the selected new pattern from the read only memory. Typically, at least several pixel codes will be contained in each such pattern data word. For example, if the pixel code is four bits long, and the computer normally operates upon sixteen bit data words, there will be four pixels in each pattern data word. It is necessary for the display subroutine to then examine each pixel, one at a time, to determine if that pixel is "transparent" or if it has a particular darkness or color.

A "transparent" pixel is one which has no color. Therefore, the color of the presently displayed background pattern is not to be changed when the selected new pattern is written into the display memory and then displayed on the CRT, as explained above. In other words, the background pattern "shines" through any "holes" in the new pattern that is displayed on the CRT. To accomplish this, the display subroutine must write the subject pixel code into the display memory if that pixel is not transparent. If that pixel is transparent, the computer must make a decision not to write the corresponding pixel code into the display memory.

In order to examine a particular pixel code in a pattern data word, the display subroutine must save the rest of that pattern data word, and then "mask" out (i.e., set to "zeros") the rest of that pattern data word, and then shift that pixel code, for example, to "right register" it. Only then can the display subroutine make the necessary check to determine if the subject pixel code indicates whether the subject pixel is transparent or is to be written into the presently addressed pixel code location of the display memory. Furthermore, in order to write a single four bit pixel code into a display memory location that contains many more bits than the pixel code, it is necessary that the display subroutine first fetch the word in that display memory location, mask out the four bits wherein the subject pixel code is to be written, and store the masked word. The subject pixel code (if it is not transparent) must be shifted to a location in a word that is otherwise masked, and exclusively ORed with the stored masked word. The resulting word is then written into the presently addressed location of the display memory.

Obviously, if the computer data word is the same length as the pixel code, no such shifting and masking operations are necessary, but a typical pixel code is only four bits (e.g., to specify one of sixteen colors, including transparent). Efficient state of the art computers usually have much wider data words, typically from eight to sixty or more bits in a data word. In such computers, the above-described prior methods of effecting display of patterns are less efficient than is desirable. Therefore, there is an unmet need for improved computer apparatus and methods for more efficiently displaying data on a screen.

Accordingly, it is an object of the invention to provide an improved apparatus and method for efficiently displaying data on a display unit.

It is another object of the invention to provide a display apparatus and method that reduce the number of computer operations necessary to display data for a computer system having data words that are longer than the pixel codes used.

It is another object of the invention to provide an improved display apparatus and method that avoid the need to read the display memory before writing a relatively narrow pixel code into a relatively wide data word location in the display memory.

SUMMARY OF THE INVENTION

Briefly described, and in accordance with one embodiment thereof, the invention provides an apparatus and method for displaying previously selected patterns on previously selected screen locations by using a computer to fetch pattern data from a dedicated memory and then output pixel codes representing the transparency or darkness of respective pixels of the selected patterns to a display memory system that senses whether each pixel code "inhibits" writing of that pixel code into the pixel code storage portion of the display memory system if the corresponding pixel is transparent, or "enables" writing of that pixel code into the pixel code storage portion if the corresponding pixel is not transparent. In one described embodiment of the invention, patterns available for selection are stored in the form of four-bit pixel codes in a dedicated EPROM (electrically programmable read only memory). A processor fetches the selected pattern, one byte at a time from the read only memory, and outputs the selected byte to the display memory system. The sensing circuitry includes two logic gates that test the upper and lower "nibbles", respectively, of the fetched byte of pattern data. Each logic gate generates inhibit signals that inhibit writing of the corresponding pixel code into the pixel storage portion of the display memory system if that pixel code is equal to all "zeros", wherein the condition that all "zeros" by definition means that the corresponding pixel is transparent. If the inhibit signal is not generated in response to sensing of a pixel code, the circuitry enables that pixel code to be written into the pixel storage portion of the display memory system.

The pixel storage portion of the display memory system includes a random access memory organized into commonly addressable words. Each word includes a plurality of separately writable portions that include the same number of bits as a pixel code, so a single pixel code in an addressed word location can be modified by inhibiting the write signals to the remaining separately controllable sections of the random access memory. The display memory address generating circuitry automatically accesses the display memory system to update the display of the present contents of the pixel storage portion on a screen of the display device (which is a CRT in the described embodiment of the invention) when the display memory system contents are not being modified by the processor. In another described embodiment of the invention, the stored patterns available to be called up for display by the computer are stored in the dedicated memory in the form of simplified pixel codes which are fetched from the dedicated memory and are converted to longer pixel codes by reference to a look-up table. The longer pixel codes then are output by the computer to the display memory system.

DESCRIPTION OF THE INVENTION

Figure 1:
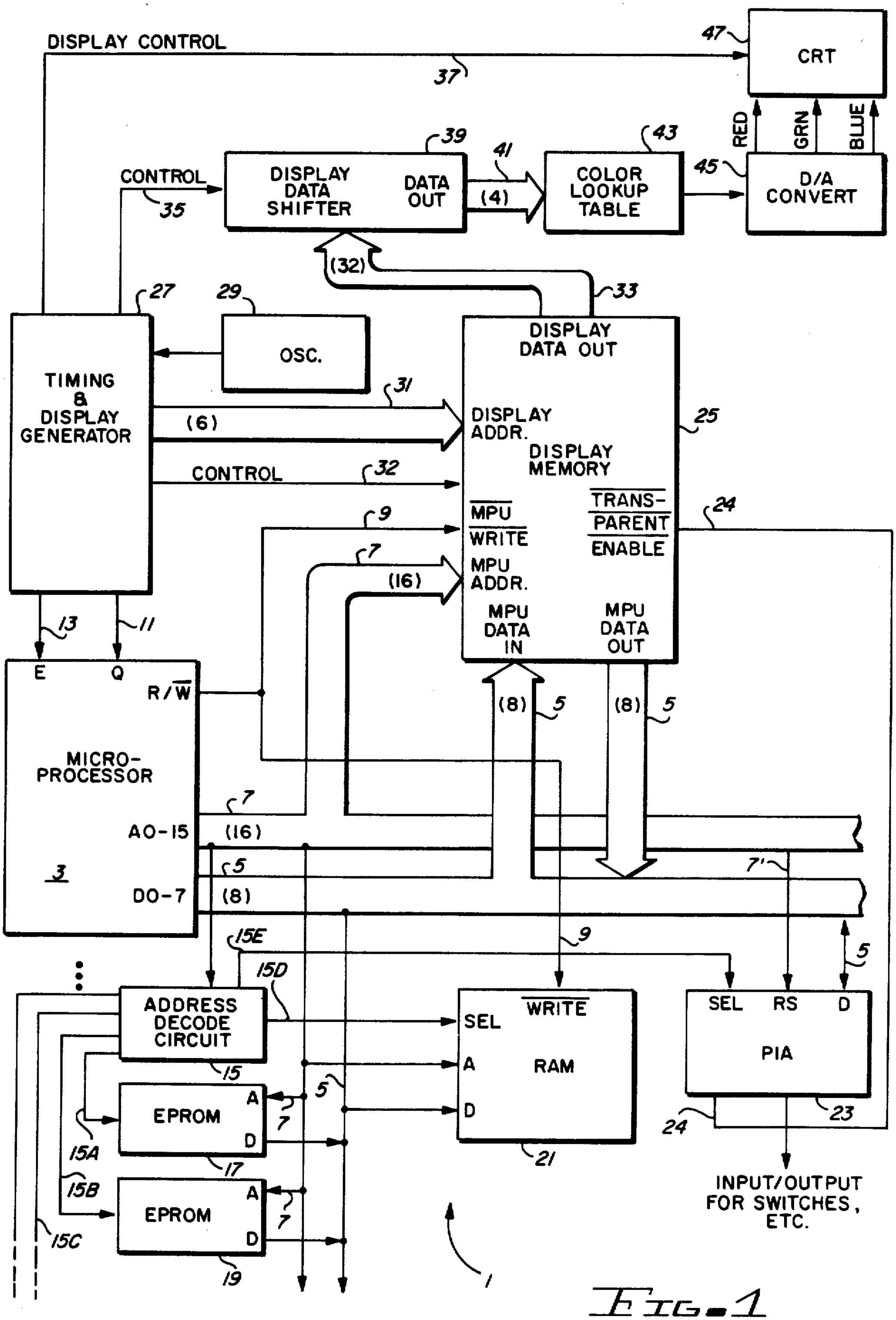
FIG. 1 is a block diagram of the apparatus in which the present invention is embodied.

Referring now to FIG. 1, microprocessor 3, which can be a Motorola MC68A09E microprocessor, has its data bus terminals D0–D7 connected to eight bit data bus 5 and its 16 address outputs A0–A15 connected to 16 conductor address bus 7. A decoder circuit 15 has its inputs connected to address bus 7 and produces a number of enable signals 15A–15E to selectively enable the appropriate memory and input/output devices included in system 1. Decoder circuit 15 can be easily implemented using Signetics 82S123 programmable read only memories, although other commercially available integrated circuit decoders could also be used.

The system 1 includes a plurality of read only memories including 17, 19, etc., having their data output terminals connected to the respective conductors of 8-bit data bus 5. The read only memories 17, 19, etc. have their address inputs connected to appropriate ones of the conductors of address bus 7. The enable inputs of read only memory circuits 17 and 19 are connected to enable conductors 15A and 15B, respectively. Reference numeral 15C designates additional enable output conductors of decode circuit 15 that can be connected to additional read only memory circuits (not shown). The read only memory circuits 17, 19, etc. can be implemented by means of TMS2532 EPROMS (electrically programmable read only memory) manufactured by Texas Instruments. These devices are organized as 4096 words by eight bits. The particular read only memory to be selected is selected by address decoder circuit 15, which decodes certain lines of address bus 7.

System 1 also includes a 256 word by 8-bit random access memory 21, which can be implemented by means of two 145101 CMOS static memory integrated circuits, manufactured by Motorola. The address inputs of random access memory 21 are connected to address bus 7, and the data bus terminals of random access memory 21 are respectively connected to data bus 5. The select input of random access memory 21 is connected to conductor 15D. Random access memory 21 performs a scratch pad memory function for System 1. The read only memory 17, 19, stores the operating program executed by microprocessor 3, including a main program (which is not the subject of the present invention) and the display program, which is closely related to the present invention.

A peripheral interface adaptor (PIA) has its data bus terminals connected to data bus 5, its register select (RS) inputs connected to two conductors 7' of address bus 7. The select input of interface adaptor 23 is connected to conductor 15E of decode circuit 15. Peripheral interface adaptor 23 can be implemented by means of a Motorola MC68A21 integrated circuit peripheral interface adaptor. Its PA7 terminal is connected to conductor 24, which conducts a "transparent enable" signal to the display memory 25, subsequently described.

When System 1 produces display information to be displayed on cathode ray tube (CRT) display element 47, it first causes the data representing the information to be written into display memory 25. Display memory 25 is organized as 16,384 words of 32 bits each, and can be implemented by means of Motorola MCM4116 integrated circuit 16,384 word by one bit random access memory devices. It includes a $\overline{\text{TRANSPARENT ENABLE}}$ input connected to conductor 24, eight "MPU DATA OUT" bus terminals connected to data bus 5, and "MPU DATA IN" bus also connected to data bus 8, 16 MPU address inputs connected to the respective conductors of address bus 7, a $\overline{\text{MPU WRITE}}$ input conductor 9 connected ot a R/$\overline{\text{W}}$ output of micrprocessor 3. This R/$\overline{\text{W}}$ conductor 9 is also connected to the $\overline{\text{WRITE}}$ input of random access memory 21.

Display memory 25 also includes a plurality of display address input terminals connected to the 16 conductors of a display address bus 31. This bus 31 is connected to circuit 27, which includes conventional circuitry for generating timing signals and display address signals on display address bus 31, and keeps shift register circuitry 39, display memory 25, CRT 47 and microprocessor 3 in proper synchronization. Circuit 27 generates timing signals on conductors 11, and 13, which are the Q (quadrature clock) and E (main clock) timing inputs of microprocessor 3. The basic clock signal used by circuitry 27 as an input is generated by clock generator circuit 28, which can be implemented by means of a K1100A integrated circuit which is manufactured by Motorola. It produces a basic clock signal having a frequency of 21.3 megahertz.

Timing and display address generator circuit 27 (FIG. 1) continuously generates the display addresses that are applied to display memory 25 when it is not being "updated" (i.e., having new pattern written into it) by microprocessor 3.

Circuitry 27 generates control signals on conductors 35 and display control signals on conductor 37. The 32 data output conductors of display conductors memory 25 are connected to the 32 respective conductors of bus 33, which are, in turn, connected to a 32 bit data display shift register 39 having control inputs connected to conductors 35. Four data output terminals of display data shifter circuit 39 are connected to four conductor bus 41. The four bits on bus 41 at any particular time represent the color code for the next pixel to be displayed on CRT screen 47. This four bit color code is applied to the address inputs of a look-up memory 43, which can be implemented by means of a typical read-only memory. The digital outputs of look-up table memory 43 are applied, in three groups thereof, to the inputs of three respective digital-to-analog converters 45 which generate three corresponding signals connected to the "red", "green" and "blue" control inputs of CRT 47. A wide variety of commercially available integrated circuit low cost digital-to-analog converters can be easily used to implement these three digital-to-analog converters. Display control conductors 37 are also connected to the horizontal and vertical sync inputs of CRT 47.

Timing and display generator circuitry 27 can be easily implemented by those skilled in the art, since it is very typical of circuitry used in computer systems that include a display memory, a display CRT, and a processor that updates the display memory. For example, a presently commercially available video game referred to as the "defender TM" game, sold by Struve Distributing Company, 276 West First South, Salt Lake City, Utah 84101 includes circuitry very similar to the circuitry utilized to implement circuitry 47 in FIG. 1.

It should be noted that "patterns" each consisting of numerous pixels can be stored in the form of blocks of data in read only memory 17, 19. Each pattern is contained in a rectangular block of data. Un-colored or "transparent" pixels of each pattern in a rectangular block are assigned the four-bit pixel code 0000. Fifteen other possible values of each pixel code correspond to fifteen different colors or degrees of darkness that may be selected for display of that pixel on CRT 47. Alternatively, simpler pattern codes can be stored in read only memory 17, 19, and can be used to refer to a look-up table to obtain the four bit pixel codes. This approach is especially suitable for display of alpha-numeric patterns.

As noted above, before any pattern is displayed on CRT 47, it must be written into display memory 25. This display on CRT 47 is created by sequentially reading display memory 25 at display addresses generated by circuitry 27. Each addressable location in display memory 25 contains eight separate pixel codes corresponding to eight pixels, respectively, on the screen of CRT 47.

Display data shifter circuit 39 is a conventional shift register that contains 32 bits which can be loaded in parallel. Four adjacent bits of shift register circuitry 39 are connected in parallel. Eight pixels are output from display memory 25 to shift register circuit 39 for each address generated by display address generator circuitry 27. One four bit pixel code is output to color look-up table circuit 43 in response to the control signals on conductors 35. Color look-up table 43 generates an appropriate digital code applied to the inputs of digital-to-analog converter circuitry 45 to produce the necessary analog signal levels on the "red", "green" and "blue" inputs of CRT 47, in order to produce the selected color tone specified by the last pixel code outputted from display data shifter circuitry 39. It should be noted that digital-to-analog converters having three respective digital input terminals connected to three different groups of the output conductors of color look-up table memory 43.

Figure 2:
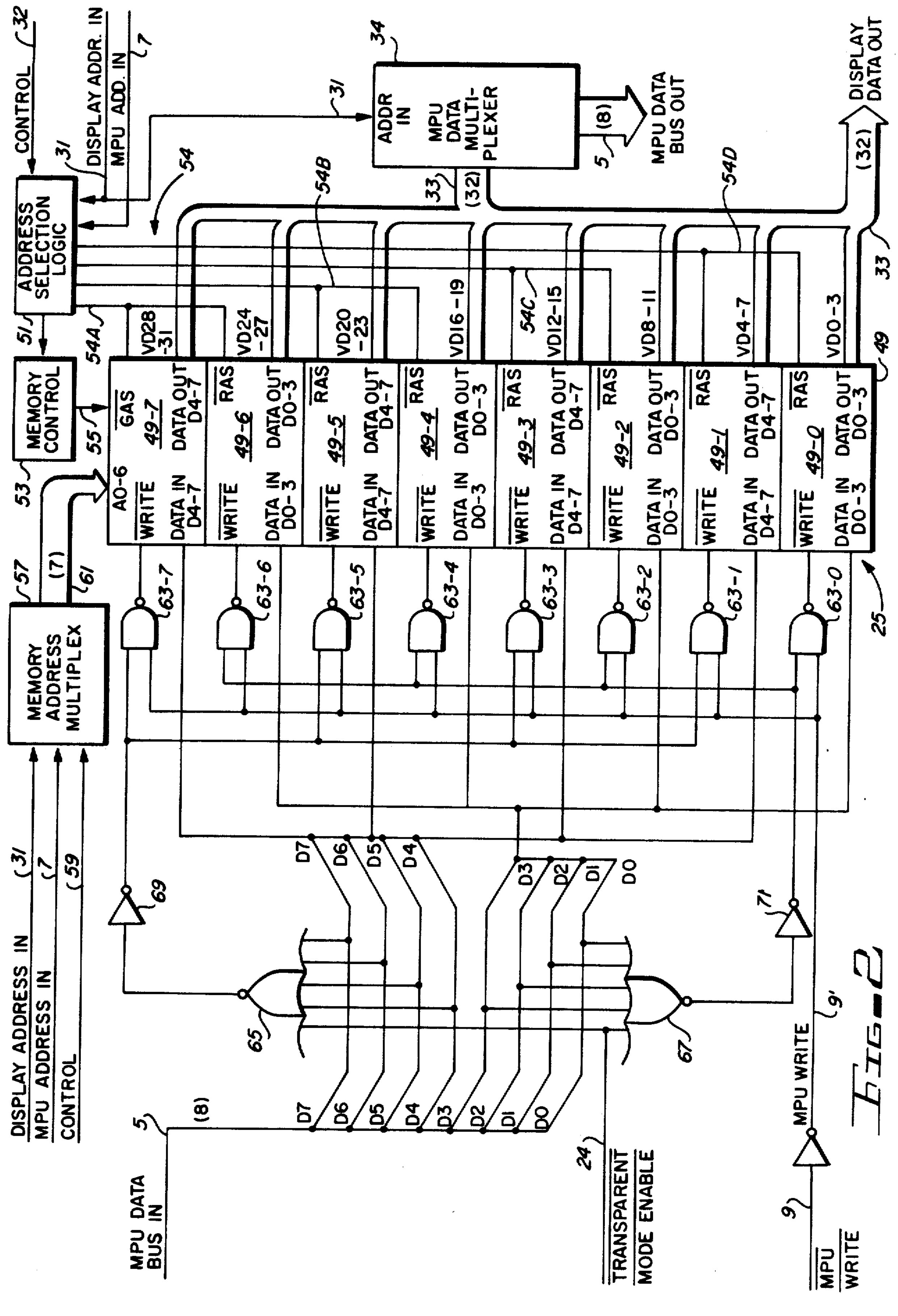
FIG. 2 is a detailed block diagram of the display memory system included in the block diagram of FIG. 1.

Referring to FIG. 2, display memory 25 includes a random access memory pixel storage section 49. Pixel storage section 49 includes eight sub-sections 49-0, 49-1, . . . 49-7, each of which is implemented by means of four Motorola MC4116 integrated circuit 16,384 words by one-bit integrated circuit memory chip. Eight different groups, of four conductors each, of display data output bus 33 are connected to respective ones of the above-mentioned memory subsections 49-0 . . . 49-7. For example, the conductors denoted VD0–VD3 are respectively connected to the data terminals of the four MCM4116's of pixel storage subsection 49-0. Conductors VD4–VD7 are similarly respectively connected to the data terminals of the four MCM4116's of pixel storage subsection 49-1, and so forth. The $\overline{\text{CAS}}$ (column address strobe) inputs of each integrated circuit MCM4116 are connected to conductor 55 of memory control circuit 53. Memory control circuit 43 can be easily implemented by those skilled in the art. See, for example, The 1979 Mostek "*Memory Data Book and Designs Guide*", page 257 et seq., incorporated herein by reference. The $\overline{\text{RAS}}$ (row address strobe) inputs of the various MCM4116's in the eight memory subsections are connected to respective ones of the address selection logic outputs 54A, 54B, 54C and 54D, as shown in FIG. 2.

The A0–A6 address inputs of each MCM4116 integrated circuit are connected to the respective conductors of eight-input multiplexer address bus 61, which is connected to the output terminals of memory address multiplexer circuit 57. The inputs of memory address multiplexer circuit 57 are connected to the 16 conductors of display address bus 31, and corresponding address inputs of memory address multiplexer circuit 57 are respectively connected to the 16 conductors A0–A15 of address bus 7. A control signal from circuitry 27 and denoted by reference numeral 59 determines which address bits are multiplexed onto bus 61. The memory address multiplexer circuit 57 simply alternatively selects between the address generated by circuitry 27 and microprocessor 3. Eight 74LS253 integrated circuit multiplexers can be used to implement memory address multiplexer circuitry 57.

Bits D0–D1, D2, and D3 of microprocessor data bus 5 are respectively connected to the data input terminals of the four MCM4116's in each of pixel storage sections 49-0, 49-2, 49-4, and 49-6. Conductors D4–D7 of microprocessor data bus 5 are connected, respectively, to the data in terminals of the four MCM4116's in each of pixel storage subsections 49-1, 49-3, 49-5, and 49-7. The $\overline{\text{WRITE}}$ inputs of each of the MCM4116's in pixel storage subsection 49-0 are connected to the output of NAND-gate 63-0. The $\overline{\text{WRITE}}$ inputs of each of the MCM4116's in pixel storage subsection 49-1 are connected to the output of two input NAND-gate 63-1. The $\overline{\text{WRITE}}$ inputs of the remaining pixel storage subsections are similarly respectively connected to the outputs of two input NAND-gates 63-2 to 63-7. One input of each of two input NAND-gates 63-0 to 63-7 is connected to the complement of the write signal produced on conductor 9 by microprocessor 3.

Display memory 25 includes five-input NOR gate 65 and five-input NOR gate 67, one input of each being connected to conductor 24, on which $\overline{\text{TRANSPARENT MODE ENABLE}}$ signal is conducted. Data bus conductors D0–D3 of data bus 5 are connected to respective inputs of NOR gate 67. Data bus conductors D4–D7 of data bus 5 are connected to the remaining four inputs of NOR gate 65. The output of NOR gate 65 is inverted by inverter 69 and is applied to the remaining inputs of two-input NAND gates 63-1, 63-3, 63-5, and 63-7. The output of NOR gate 67 is inverted by inverter 71 and applied to the remaining inputs of two-input NAND gates 63-0, 63-2, 63-4, and 63-6.

The thirty-two conductors of display data bus 33 are connected to thirty-two inputs of multiplexer 34, the eight outputs of which are connected to the respective conductors of microprocessor data bus 5. The other inputs of multiplexer 34 are connected to address bus 31. Multiplexer 34 can be implemented in the same manner as memory address multiplexer 57, described above.

Address selection logic 51 selects which of the display addresses and microprocessor addresses are used to address a particular location in pixel storage section 49 and also effectuates reading of pixel storage section 49 to load the selected pixel codes into display data register 39 and ultimately to CRT 47. Implementation of address selection logic 51 is straightforward, and can be found in the above-referred "1979 *Mostek Memory Data Book and Designer's Guide*", page 257 et seq.

When the microprocessor accesses display memory 25, the address output by the microprocessor 3 onto address bus 7 results in selection of only two of the pixel storage subsections such as 49-0 and 49-1. The microprocessor must read data and write data to and from display member 25 one byte at a time. The eight bits being read out of or written into the two selected pixel storage subsections appear on eight bits of display data bus 33, all of which are connected to inputs of microprocessor data multiplexer 34. The address inputs on address bus 31 connected to the address inputs of data multiplexer cause these eight bits to be coupled to the eight conductors of microprocessor data bus 5.

In the case wherein microprocessor 3 writes data into display memory 25, this data is conducted along the respective conductors of microprocessor data bus 5 to the MPU data in terminals (FIG. 1) of display memory 25, as shown on the left-hand side of FIG. 2. Each "nibble" or four bit block consisting of bits D0–D3 and D4–D7 of the data to be written into display memory 25 are tested by NOR gates 67, and 65, respectively, to determine if the $\overline{\text{TRANSPARENT MODE ENABLE}}$ signal is at a logical "zero", in order to detect if either nibble is all logical "zeros". As explained previously, condition is interpreted to mean that the pixel corresponding to that nibble is "transparent". If the pixel is transparent, the output of the corresponding NOR gate (65 or 67) will be at a logical "one". The output of the corresponding inverter (69 or 71) then will be at a logical zero. Since conductor 9 will be at a logical "zero" for a write operation, causing one input of each two input NAND gate 63-0, . . . 63-7 to be a logical "one", it can be seen that if a particular pixel is all "zeros", the outputs of all of the NAND gates corresponding to that nibble will be inhibited. If the value of the pixel code is other than all "zeros", the output of the corresponding NOR gate (65 or 67) will be a logical "zero". This logical "zero" will be inverted and be applied to "enable" the NAND gates corresponding to that nibble. The MPU WRITE signal on conductor 9' then will be enabled to produce the $\overline{\text{WRITE}}$ signal conducted to the pixel storage sections 49-0, 49-7 that are coupled to the data bus conductors (D0–D3 or D4–D7) that are sensed by the NOR gate that is a logical "zero".

Thus, each eight bit data word, containing two pixels of the selected pattern, is conducted by conductors D0–D7 of microprocessor data bus 5. The upper nibble is tested by NOR gate 65 to determine if it consists of all "zeros", i.e., is transparent, and the lower nibble is tested by NOR gate 67 to determine if it is "transparent". This test is made only if the $\overline{\text{TRANSPARENT MODE ENABLE}}$ on conductor 24 is at a "zero". If the nibble in question is transparent, the corresponding NOR gate (65 or 67) and inverter (69 or 71) disable the microprocessor write signal, preventing anything from being written into the presently addressed pixel storage location, which therefore remains unchanged. If the nibble or pixel code in question on data bus 5 is not transparent, the microprocessor write signal is not disabled, and the subject pixel code is written into the appropriate bits of the presently addressed location of pixel storage section 49.

The $\overline{\text{TRANSPARENT MODE ENABLE}}$ signal on conductor 24 is normally at a logical "zero" except during initialization of the System 1 or during testing thereof.

The circuitry shown in FIG. 2 is entirely typical for a CRT display system, except for the logic circuitry including NOR gates 65 and 67, inverters 69 and 71, and NAND gates 63-0, . . . 63-7 and provision of the $\overline{\text{TRANSPARENT MODE ENABLE}}$ signal on conductor 24.

Figure 3:
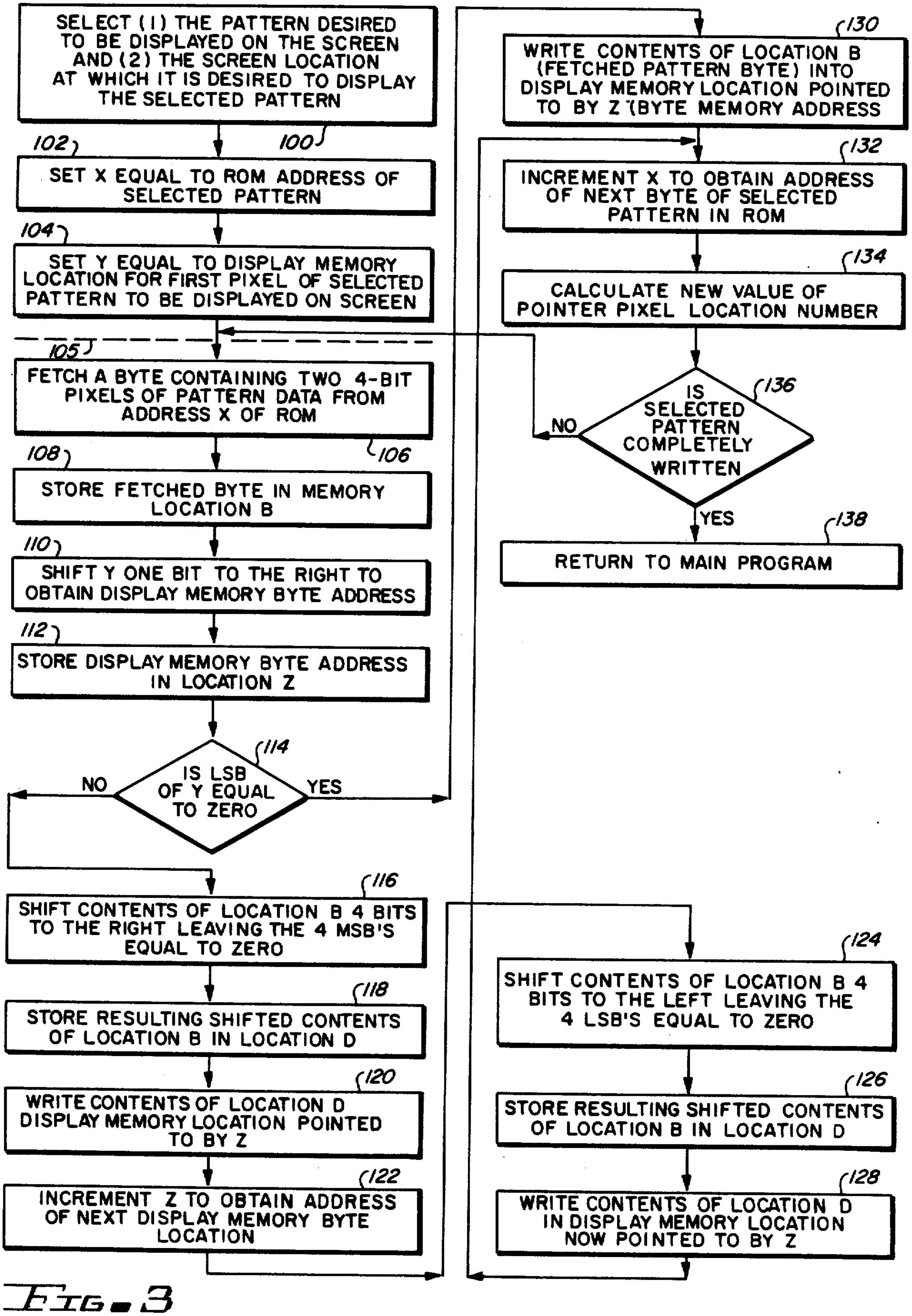
FIG. 3 is a flow chart of a program including display subroutines executed by the microprocessor in FIG. 1.

FIG. 3 discloses a flow chart of the display subroutine executed by microprocessor 3 in accordance with the invention. Before the display subroutine can perform its function of displaying patterns on the CRT screen, the "main program" (which can be any program, such as a video game program, that performs a function that results in a required display of information or other patterns on the CRT) selects which patterns are to be displayed on the screen on the CRT, and also determines at which screen locations those selected patterns are to be displayed.

These two steps are indicated in block 100 of FIG. 3. Next the main program sets a ROM (read only memory) address pointer X equal to the address of the first byte of the selected pattern, as indicated in block 102. Then, the main program sets a pixel location pointer Y equal to the screen location or pixel location number at which the first pixel of the selected pattern is to be displayed by the display subroutine, as indicated in block 104. These three blocks constitute the only portion of the flow chart of FIG. 3 that are included in the above-mentioned main program. The remaining portions of the flow chart correspond to a display subroutine that operates in accordance with the present invention. Dotted line 105 represents a line of demarcation between the main program and the display subroutine, which may be called upon by the main program when needed to modify the display on CRT 47.

The display subroutine first enters block 106 and fetches the first byte of the selected pattern from address X of read only memory 17, 19. In this described embodiment of the invention, each pixel code includes four bits, and each byte of pattern data stored in read only memory 17, 19 includes two pixel data codes. The display subroutine then stores the fetched byte of pattern data in a memory location B, as indicated in block 108.

The pixel location number or pointer Y is used in the display subroutine and in the main program to identify the various pixels in CRT 47. The display memory address is used by the microprocessor 3 to address the display memory 25. Since the display memory address or location contains and corresponds to two unique pixel location numbers, it is convenient to make the display memory address related to the pixel location numbers so that the display memory address can be obtained by dividing the pixel location numbers by two (disregarding any remainder).

In block 110, the display subroutine causes the pixel location number Y to be shifted one bit to the right, thereby dividing the pixel location number by two, to obtain the display memory address of the byte location in which the first pixel (and also the second pixel) are to be written. The display subroutine then stores this display memory address in a location Z of scratch pad memory 21, as indicated in block 112.

Next, in decision block 114, the program tests the least significant bit of the pixel location number Y to determine if it is a "zero". The purpose of this test is to determine if the subject pixel code is "right justified" in the fetched byte of pattern data stored in memory location B.

As mentioned above, each pattern data word or byte includes two pixel codes. By definition, a pixel with an "even" pixel location number Y has its least significant bit equal to a "zero" and has its corresponding pixel code located in the most significant or left-hand "nibble" (i.e., four bits) of the pattern data byte. Similarly, a pixel with an "odd" location number Y equal to a "one" has its pixel code located in the least significant or right hand nibble of the pattern data byte.

If the determination made in decision block 114 is affirmative, the program goes to block 130 and causes microprocessor 3 to write both pixel codes in the fetched pattern data byte into the location of display memory 25 presently pointed to by the memory address previously stored in location Z (see blocks 110 and 112).

It should be noted that, in accordance with the invention, the fetched byte of pattern data was "written" into display memory 25 without any operations of reading the display memory or testing of each of the pixel codes to see if the corresponding pixels are transparent and making a corresponding decision whether or not to cause microprocessor 3 to output that pixel to display memory 25 in accordance with a microprocessor write operation.

Stated differently, in the present invention, microprocessor 3 always "thinks" it is writing all pixel codes in the fetched byte of pattern data into display memory 25, and never needs to test any pixel codes to determine if the corresponding pixels are transparent.

Instead, the above mentioned NOR gates 65 and 67, in conjunction with the NAND gates 63-0, 63-7, cooperate to automatically "inhibit" the write signal from microprocessor 3 to the pixel storage section 49 (FIG. 2) for a particular pixel if its corresponding pixel code is all "zeros", i.e., if that pixel is transparent. Otherwise, the pixel code is automatically written into the appropriate nibble of the addressed location of display memory system 25.

If it is determined in decision block 114 that the least significant bit of the pixel location number Y is not "zero" this means that the pixel code corresponding to that pixel location number is in the right hand or least significant nibble of the fetched byte of pattern data in location B. This may occur if a boundary of the pattern to be displayed on the CRT includes a pixel with an odd, rather than even, pixel location number. In this event, the other pixel code in the fetched byte of pattern data will correspond to a pixel to be written into the display memory location pointed to by the next display memory address output by microprocessor 3.

Still referring to FIG. 3., the program enters block 116 when the subject pixel code is "right justified" in the pattern data byte. In block 116, the program causes the pattern data byte from location B to be shifted four bits to the right (i.e., into the least significant nibble position) and sets the most significant, i.e., left, nibble equal to zero. The resulting byte is then stored in a scratch pad memory location D, as indicated in block 118.

Then the program enters block 120 and causes the microprocessor 3 to "write" the resulting byte from location D into display memory system 25. NOR gate 67 allows the least significant nibble (containing the pixel code of the pixel having location number Y) to be written into pixel storage section 49 (assuming that the subject pixel is not transparent). NOR gate 65 detects the fact that the most significant nibble is all "zeros", if this is indeed the case, and inhibits writing of those "zeros" into the upper four bits of the addressed location of display memory system 25.

Next, the program goes to block 122 and increments the address Z of the display memory 25 to obtain the next address, in which the other pixel code of the fetched pattern data byte is to be stored. Then, the contents stored in location B in block 108 are shifted four bits to the left, so that the other pixel code is shifted into the most significant nibble, and the least significant nibble of the resulting byte is set to "zero", as indicated in block 124. Then, the program enters block 126 and stores the data word produced in block 124 in a scratch pad location D.

Next, the program enters block 128 and causes microprocessor 3 to output the contents of scratch pad location D on data bus 5 and also produce a write command on conductor 9. NOR gate 65 allows the other pixel code to be written into pixel storage section 49, in the upper nibble of the location now pointed to by the pointer Z, as incremented in block 122, if the corresponding pixel is not transparent, and NOR gate 67 inhibits the writing of the "zeros" in the least significant nibble.

Then, the program goes to block 132 and increments X to obtain the address of the next byte of pattern data of the selected pattern stored in read only memory 17, 19.

In block 134, the program determines the pixel location number Y of the next pixel to be displayed. This is done by incrementing Y by two if the next pixel of the selected pattern is on the same line as the present pixel, but a larger number then two must be added to the present value of Y to obtain the next value of the address of the next pixel if the next pixel in the selected pattern is in the next lower line of the selected pattern. It will be recalled that pixel location numbers Y correspond to unique locations on the CRT screen. Therefore, if the next pixel to be written into the display memory is on the next line of the selected pattern, a number equal to the number of pixels between the present pixel and the end of the present line on the CRT screen plus the number of pixels between the beginning of the next line on the screen and the next pixel must be added to the present value of Y to obtain the next value of Y. The display program uses the width of the selected pattern and the number of pixels (256) per line of the CRT screen in order to make this calculation. After the new value of Y is obtained, the program determines if the selected pattern has been completely written into display memory system 25. If it has, the program returns to the main program via label 138. Otherwise, the program returns to fetch the next byte of pixel code information from the read only memory.

As mentioned above, the flow chart of FIG. 3 applied to the specific Motorola 68A09E microprocessor 3 shown in FIG. 1, which is an eight bit processor capable of reading or writing one byte at a time. If a larger processor, such as a 16 bit or a 32 bit processor is used, the portion of the flow chart of FIG. 3 including and following decision block 114 would have to be modified to test the two or three least significant bits of the pixel location number Y and then accordingly, write the pattern data word into the display memory 25 or, if necessary, perform an appropriate number of four bit shifts of the data word, write the data word into the display memory, increment the display memory address and perform another shift operation, and write the resulting data word into the display memory 25.

Figure 4:
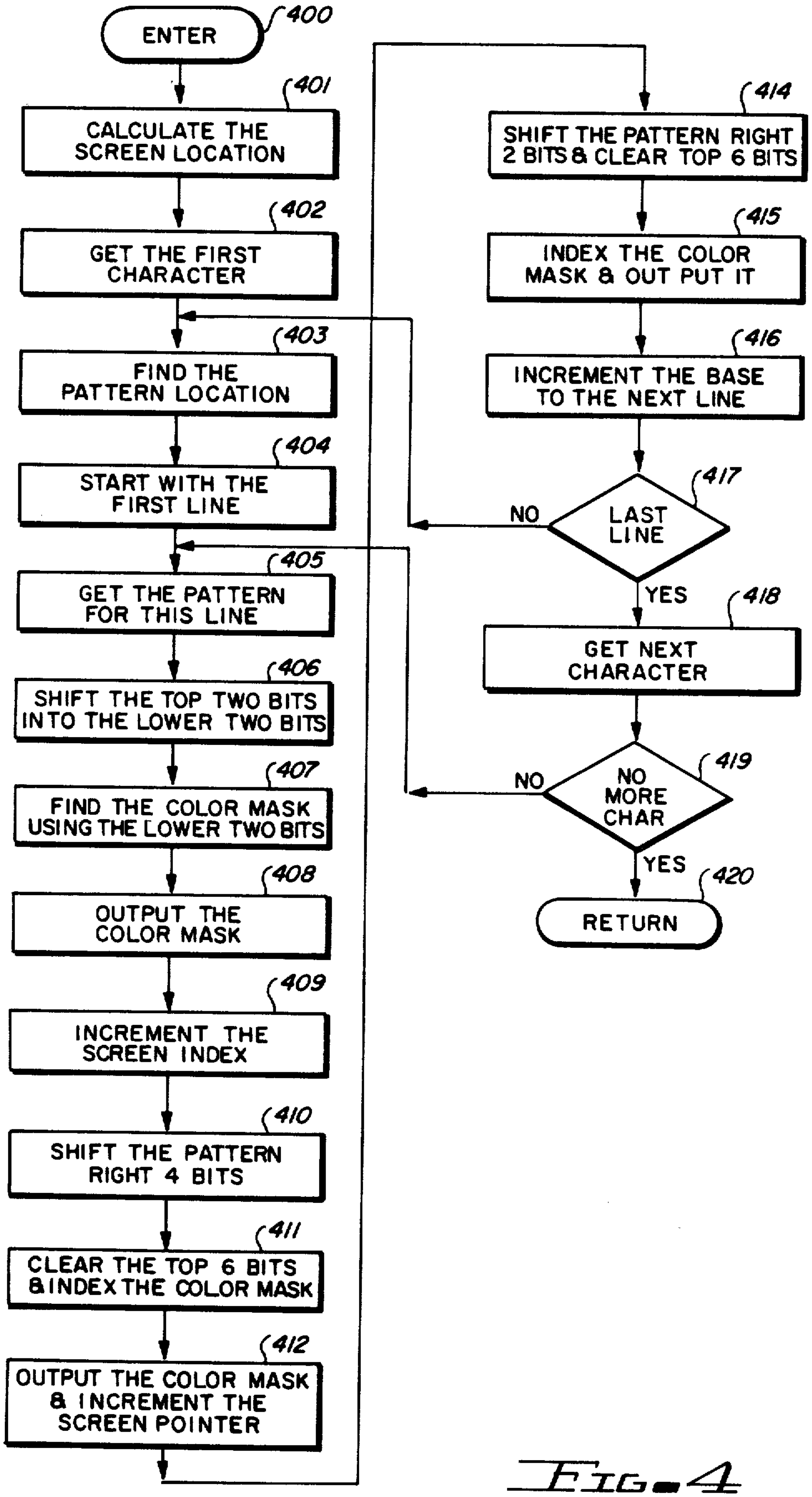
FIG. 4 is a flow chart including an alternate display subroutine executed by the microprocessor in FIG. 1.

FIG. 4 is a flow chart (similar to that of FIG. 3) of a specific program written for displaying printed messages on CRT 47. Display of printed messages stored in read only memory 17, 19 is similar to displaying any other stored pattern, except that four bit pixel codes are not needed, since only a "transparent" color and a dark color are needed.

Referring now to FIG. 4, a main program selects the character that is desired to be displayed and the desired CRT screen location at which that character is to be displayed, as indicated in blocks 401 and 402. In this case, each character is an alpha-numeric symbol stored in the read only memory in a six bit by seven bit pattern area.

In block 403, the display subroutine obtains the ROM address of the selected pattern (character). This is done by means of a subroutine that converts the selected character into a ROM address at which the pattern of the selected character is stored. As indicated in blocks 404 and 405, the display subroutine fetches the first line of the stored pattern from the ROM.

In block 406, the display subroutine shifts the top (most significant) two bits of the fetched pattern into the lower two bits which, as indicated in block 407, are used to find two four bit pixel codes that correspond to the two respective bits by referring to a look-up table that contains the four bit pixel codes that correspond to either a "transparent" pixel and a dark pixel. Each pattern is considered two bits at a time by this display subroutine. After the first two pixel codes have been output to the display memory, as indicated in block 408, the display memory printer INDX is incremented, as indicated in block 409. The previously fetched (and saved) pattern then is shifted four bits to the right. In this case, the top six bits of the pattern variable are not all "zeros", and therefore must be "cleared" or set to all "zeros", and the color mask is indexed, as indicated in block 411. Again, those next two "right registered" bits are used to refer to the look-up table to obtain two corresponding four bit pixel codes, which are output to the display memory, as indicated in block 412. As also indicated in block 412, the pointed INDX is incremented.

The display subroutine then goes to block 414 and gets the last two bits of the first line of the selected pattern. This is done by shifting the fetched pattern to the right two bits and clearing the top six bits.

Next, the display subroutine looks up the two pixel codes corresponding to the last two bits of the pattern and outputs those two pixel codes to the display memory, as indicated in block 415. Then, the display subroutine goes to the next line of the selected pattern, as indicated in block 416. This is done by adding 126 to the present display memory address. Then, the display subroutine determines if the present line is the last line of the selected pattern in block 417. If it is not the last line, the display subroutine fetches the pattern for the next line, as indicated in block 405, and re-executes blocks 407 through 417 again. If it is the last line, the display subroutine gets the next character of the message to be displayed, as indicated in block 418. If there are no more characters, the display subroutine returns to the calling program, and if there is a next character, the program re-enters block 402 and indicated in decision block 419.

The above described apparatus thus allows the microprocessor 3 to rapidly and automatically "write" display data into the display memory without the need for the previously described additional operations for testing each pixel to determine if it is transparent. This improvement increases the speed at which a particular processor can update the display memory and reduces the burden on the program to provide the numerous shifting and reading of the display memory, testing each pixel individually to determine if it is transparent, and the necessary shifting and masking operations involved, especially for processors with wide data words.

While the invention has been described with respect to a particular embodiment thereof, those skilled in the art will be able to make various modifications to the described apparatus and method without departing from the true spirit and scope thereof.

I claim:

1. A method for writing patterns into a display memory coupled to a display device by means of which the patterns are to be displayed, each of the patterns being stored in the from of pixel codes each indicating the brightness of color of a corresponding pixel of the display device when that pattern is displayed, each of said pixel codes indicating whether its corresponding pixel is to be considered transparent, said method comprising the steps of:

(a) using a processor to select a background pattern, and writing the background pattern into said display memory;

(b) using the processor to select a foreground pattern and to select a location of the display memory whereat the selected foreground pattern is to be displayed, some of the pixels of said foreground pattern having transparent pixel codes;

(c) using the processor to obtain a foreground pattern data word of the selected foreground pattern, said foreground pattern data word including at least one of said pixel codes;

(d) using the processor to transmit at least one pixel code representative of the information in the foreground pattern data word, a write signal, and an address representing the selected location, from the processor to the display memory, said transmitting being performed after the background pattern has been written into the display memory;

(e) using a sensing circuit external to the processor to effectuate sensing each transmitted pixel code, without reference to the background pattern, to determine if its corresponding pixel is to be considered transparent;

(f) for each foreground pixel code transmitted, (i) enabling said write signal to cause writing of that pixel code into the addressed location of the display memory in response to said sensing circuit on the condition that said sensing indicates that the pixel corresponding to that pixel code is not to be considered transparent, or (ii) inhibiting said write signal to prevent writing of that pixel code into the addressed location of the display memory in response to said sensing circuit on the condition that said sensing indicates that the pixel corresponding to that pixel code is to be considered transparent and therefore is not to be written into said display memory system.

2. The method of claim 1 wherein said foreground pattern data word includes information corresponding to a plurality of pixels of the selected foreground pattern.

3. The method of claim 2 wherein said information includes the pixel codes for each of the pixels of the selected foreground pattern.

4. The method of claim 3 wherein the condition that all bits of a pixel code are "zeros" indicates that the pixel corresponding to that pixel code is transparent.

5. The method of claim 4 wherein any value of a pixel code other than all "zeros" indicates the color or darkness of the pixel corresponding to that pixel code.

6. The method of claim 2 including the method of using the information contained in said fetched word to fetch said corresponding pixel code from a look-up table.

7. The method of claim 4 including the generating of a pixel location number corresponding to the desired location in the display memory for a pixel of the selected foreground pattern.

8. The method of claim 7 including the step of determining if the pixel code corresponding to said pixel location number is registered in a predetermined manner in said foreground pattern data word by testing at least one of the least significant bits of said pixel location number.

9. The method of claim 8 including the step of shifting the pixel code to a new position in the foreground pattern data word and clearing the remaining bits thereof to produce a modified foreground pattern data word, transmitting the modified foreground pattern data word to the display memory before said sensing step to effect writing that pixel code in the addressed location of the display memory if that pixel is not all "zeros", incrementing the address representing the selected locations to the next location of display memory, shifting another pixel code in the foreground pattern data word to another new position in the foreground pattern data word, clearing the remaining bits therof to produce another modified foreground pattern data word, and transmitting that modified foreground pattern data word to the display memory to effect writing of that pixel code into said next location if that pixel code is not all "zeros".

10. An apparatus for writing patterns into a display memory coupled to a display device, said apparatus comprising in combination:

a processor for performing data proessing operations;

storage means responsive to said processor for storing a plurality of said patterns, each of said patterns being stored as information including pixel codes corresponding to the brightness or color of each pixel of said display device when that pattern is displayed by the display device, said pixel codes also indicating whether each pixel is to be considered transparent;

means in said processor for selecting a background pattern and writing that background pattern into said display memory;

means in said processor for selecting (1) a foreground pattern to be displayed and (2) a location of said display device whereat the selected foreground pattern is to be displayed, some of the pixels of said foreground pattern having transparent pixels codes;

means in said processor for fetching a foreground pattern data word of the selected foreground pattern from said storage means, said foreground pattern data word including at least one pixel code;

means responsive to said fetching means for transmitting at least one pixel code representative of the information in the fetched foreground pattern data word, a write signal and an address representing the selected display location to said display memory after the background pattern has been written into said display memory;

sensing means external to said processor and coupled to said display memory for receiving said transmitted pixel code of the fetched foreground pattern data word and sensing each transmitted pixel code, without reference to the background pattern, to determine if its corresponding pixel is transparent;

write circuit means responsive to said sensing means for (1) enabling said write signal to effect writing of each of said transmitted pixel codes into a presently addressed location of said display memory on the condition that said sensing means determines that the pixel corresponding to that pixel code is not to be considered transparent; and (2) inhibiting said write signal from effecting writing of each of said transmitted pixel codes into the presently addressed location of said display memory on the condition that said sensing means determines that the pixel corresponding to that pixel code is to be considered transparent.

11. The apparatus of claim 10 wherein said foreground pattern data word includes information corresponding to a plurality of pixels of the selected foreground pattern.

12. The apparatus of claim 11 wherein said information inlcudes the pixel codes for each of the pixels of the selected foreground pattern.

13. The apparatus of claim 11 wherein the condition that all bits of a pixel code are "zeros" indicates that the pixel corresponding to that pixel code is transparent.

14. The apparatus of claim 13 wherein any value of a pixel code other than all "zeros" indicates the color or darkness of the pixel corresponding to that pixel code.

15. The apparatus of claim 11 further including means for operating on information contained in said fetched data word to fetch said corresponding pixel code from a look-up table contained in a read only memory.

·16. The apparatus of claim 10 wherein said storage means includes a read only memory and said display memory includes a pixel storage portion including a random access memory.

17. The apparatus of claim 16 wherein said selecting means, said fetching means, and said transmitting means are included in a microprocessor.

18. The apparatus of claim 17 wherein said sensing means includes a plurality of logic gates corresponding, respectively, to pixel codes transmitted by said transmitting means for producing an inhibit signal if a pixel code corresponding to a transparent pixel is applied to the inputs of that logic gate.

19. The apparatus of claim 18 wherein said write circuit means includes a plurality of logic gates, each having an input coupled to a conductor coupling said write signal and an input coupled to one of said logic gates included in said sensing means, and an output coupled to a write input of said random access memory.

20. The apparatus of claim 19 wherein said plurality of logic gates of said sensing means are connected to form a plurality of pixel-wide transparent pixel code sensing circuits, each of which generates a separate inhibit signal in response to a transparent pixel code sensed by that transparent pixel code sensing circuit.

21. The apparatus of claim 20 wherein said plurality of logic gates of said write circuit means are connected to form a plurality of pixel-wide write inhibit circuits, each of which is responsive to a respective one of said separate inhibit signals to only inhibit writing of the transparent pixel code sensed by the pixel-wide transparent pixel code sensing circuit producing that separate inhibit signal.

* * * * *